United States Patent Office 3,435,173
Patented Mar. 25, 1969

3,435,173
ANNEALING DEVICE WITH AUTOMATIC
CONTROL THEREFOR
Eugene N. Connoy, Minneapolis, and Dale R. Boehne,
Excelsior, Minn., assignors to Continental Machines,
Inc. Savage, Minn., a corporation of Minnesota
Filed Aug. 25, 1966, Ser. No. 575,037
Int. Cl. H05b 1/02, 11/00
U.S. Cl. 219—50                                    1 Claim

ABSTRACT OF THE DISCLOSURE

A photosensitive cell is positioned between a pair of jaws that grip a saw band at opposite sides of a weld extending transversely thereof, to be responsive to light rays emanating from the weld zone as the temperature thereof rises due to the passage of an electric current flowing from one jaw to the other through the weld zone, the photosensitive cell being connected in a bridge circuit which controls the connection of the jaws with a current source and terminates current flow at the proper instant as determined by the intensity of the light rays impinging the photosensitive cell.

---

Figure 1:
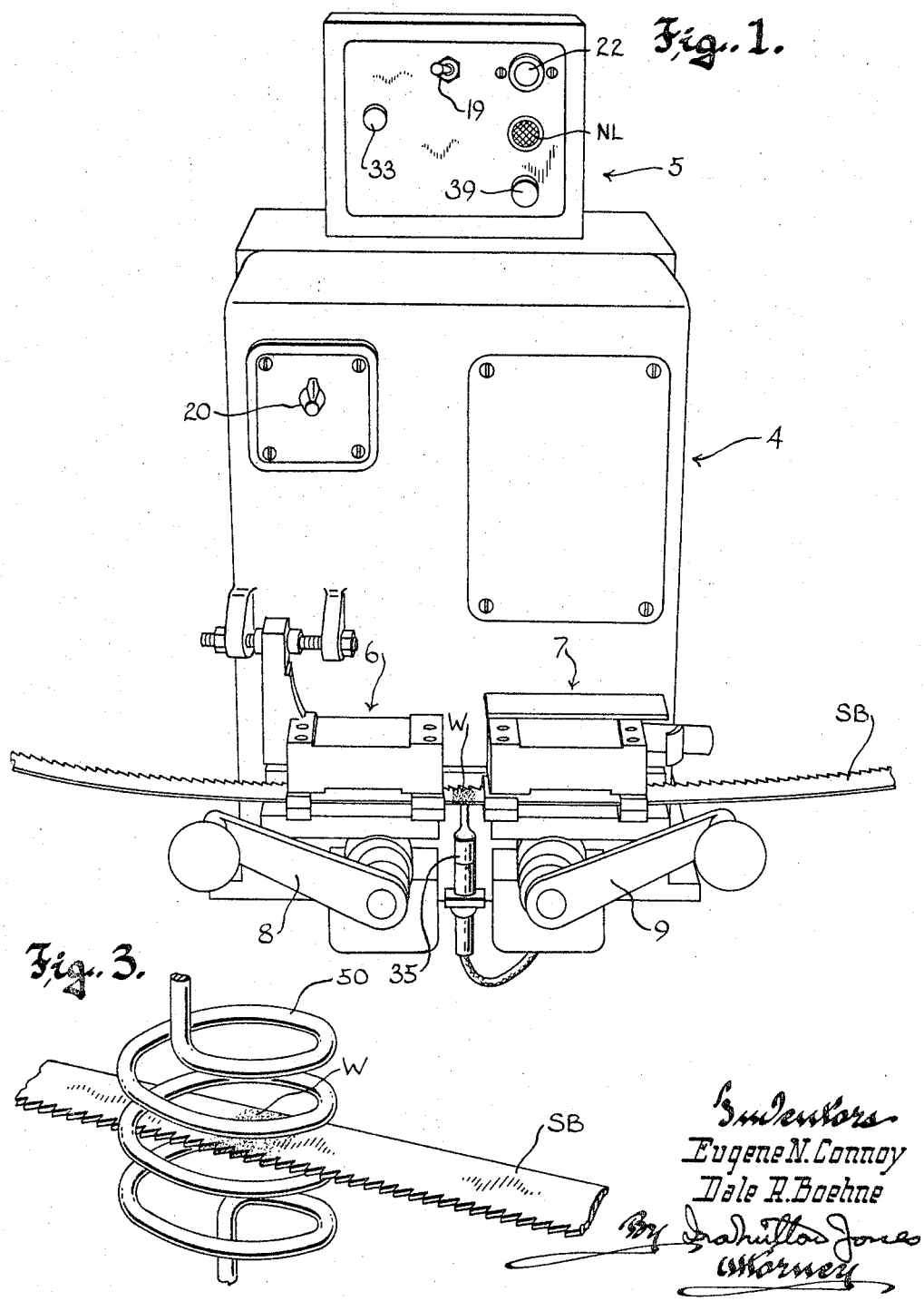

This invention is concerned with the problem of annealing or tempering spring tempered alloy steel, and especially the heat-affected weld zone of metal cutting saw bands.

Users of band sawing machines usually purchase their requirements of saw bands in large coils, from which they cut lengths appropriate to their machines. These lengths of saw band are then formed into endless loops by welding together the ends thereof. This results in a very hard and brittle section adjacent to the line of weld, which is generally referred to as the weld zone. Unless this weld zone is annealed and tempered to a hardness comparable to that of the rest of the band, a highly undesirable condition exists.

With metal cutting saw bands formed of standard carbon steel or high speed tool steel, and even with wood cutting saw bands made of spring tempered alloy steel which have a polished oxide-free finish, annealing and tempering to the correct hardness is quite easily accomplished, since the temperatures involved can be reliably identified by visually observing the color of the heated portion of the band. However, with metal cutting saw bands made of spring tempered alloy steel, this is not possible. Metal cutting spring tempered alloy steel saw bands are formed of annealed raw stock and then heat treated in the final operation. As a result, the saw band has a gun barrel blue oxide finish which precludes using the visual observation technique to identify the temperature of the heated portion of the band.

To obtain correct hardness—approximately 45 RC—in the weld zone of a metal cutting spring tempered alloy steel saw band, it must be heated to a temperature between 875° F. and 925° F., and held at that temperature for about ten seconds. Optimum results are obtained at 900° F. held for ten seconds. If the temperature is below 875° F., the hardness of the weld zone will not be reduced sufficiently to eliminate objectionable brittleness, and if the temperature is digher than 925° F., the hardness of the weld zone will be too low and hence this portion of the band will lack the strength needed to carry the tension loads imposed upon the band in use, which are in excess of 30,000 p.s.i.

With the foregoing observations in mind, it is the purpose and object of this invention to provide an automatic annealing device especially adapted for use in annealing localized areas of spring tempered alloy steel metal cutting saw bands, by which a predetermined hardness can be automatically obtained with assurance of accurate and reliable repeatability.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
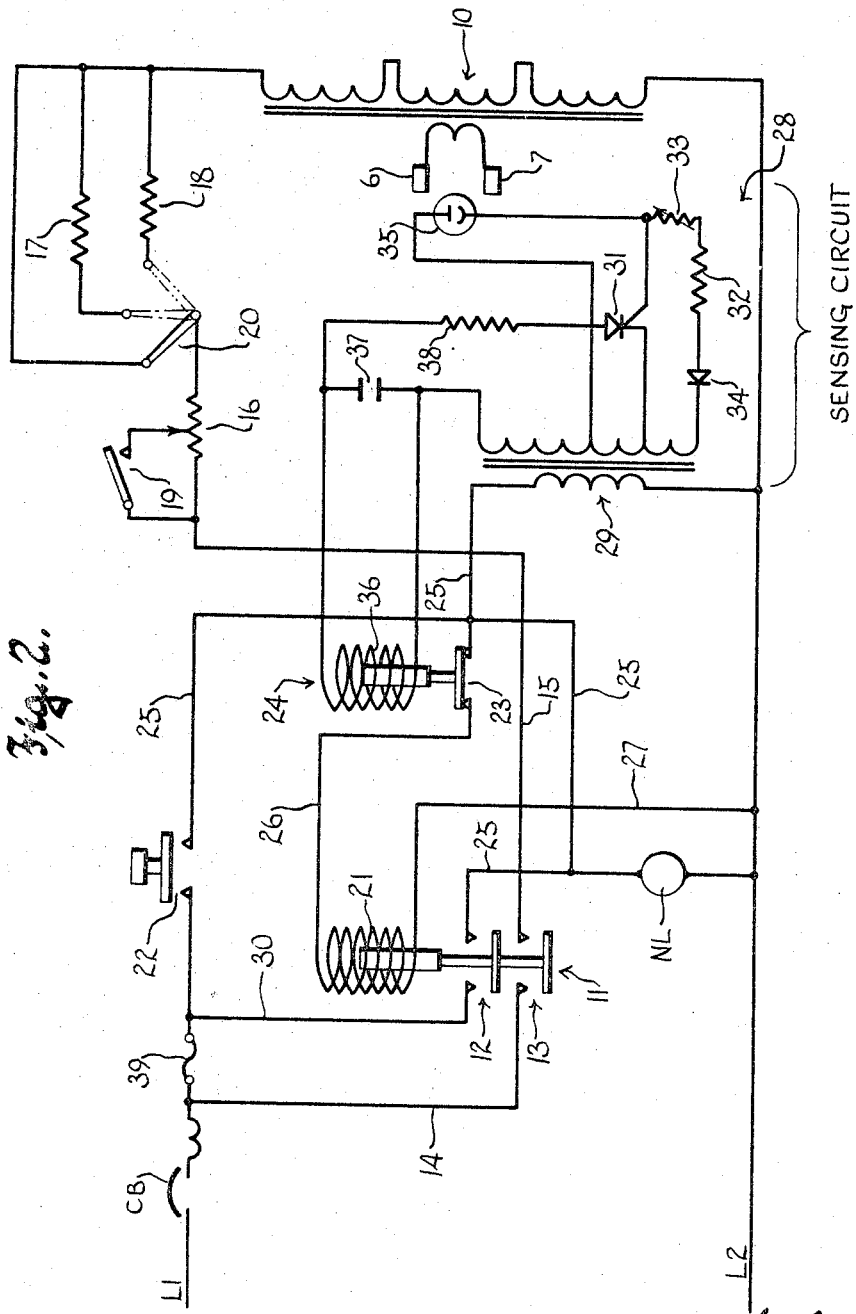

The accompanying drawings illustrate two complete examples of the physical embodiments of the invention, constructed according to the best modes so far devised for the practical application of the principles thereof, and in which:

FIGURE 1 is a perspective view of an automatic annealing device embodying this invention in its preferred form, wherein the annealing heat is obtained by passing an electric current through the portion of the band being treated, said view illustrating the device in its condition of use;

FIGURE 2 diagrammatically illustrates the electrical circuitry of the device; and FIGURE 3 is a perspective view illustrating the use of induction heating as the heat source by which the weld zone of the band is brought to its annealing temperature.

Before proceeding with the description of the structure and circuitry illustrated in the drawings, it would be well to observe that this invention rests upon the discovery that a photosensitive cell so positioned that light rays emanating from the surface of the portion of the band being heated impinge upon its lens, can be used to automatically effect termination of the heating cycle at exactly the right time to assure the attainment of the desired hardness, despite the gun barrel blue oxide finish of the saw band.

It should also be noted that before making this discovery, several other possible ways of timing the duration of heat application and the temperature of the heated section, such as measuring the power input to the annealer, and into the band, and controls based on time, were tried but without success. None of the various possibilities tried was able to cope with the inevitable variables that are encountered, such as band width, guage, pitch of the saw teeth, clamping pressure of the jaws or electrodes by which the heating current is fed into the saw band, and the surface condition of the jaws or electrodes and of the band. These variables made it impossible to maintani a reliably repeatable control of the annealing temperature until the aforesaid discovery led to the solution of the problem.

In the drawings, the numeral 4 designates the main structure or casing of the device, in which the power transformer that supplies the annealing current is housed, and the numeral 5 designates generally the control unit for the annealer. On the front of the main structure or casing there are two pairs of jaws 6 and 7. These jaws are adapted to grip a sawband SB at opposite sides of a localized portion thereof to be annealed and tempered, and which in practice is usually the weld zone or area that results from welding together the adjacent ends of a length of band to form the same into a loop.

As is customary, each pair of jaws comprises relatively movable upper and lower jaw sections arranged to be opened and closed by means of handles 8 and 9. The jaws are electrically conductive and thus provide electrodes by which a band gripped thereby may be connected in an electric heating circuit. As illustrated in the schematic diagram, FIGURE 2, the electrodes provided by the jaws are connected with the output terminals of the power transformer 10 that is housed within the casing 4, so that whenever the transformer is energized, current will flow through the localized portion or section W of a saw band gripped by and extending between the two pairs of jaws.

The transformer 10 is energized by connecting its primary winding across a power source represented by lines L1 and L2. One of the input terminals of the transformer may be directly connected with the line L2, as shown; the other input terminal is connected with line L1 upon energization of a relay 11. This relay has two sets of normally open switch contacts 12 and 13. Closure of the contacts 13 closes the primary circuit of the transformer which, beginning with line L1, comprises a conductor 14, the switch contacts 13, and a conductor 15 which may have one or more of a plurality of resistances 16, 17 and/or 18 connected in series therewith by appropriate actuation of selector switches 19 and 20. Selection of the resistance connected into the circuit by means of the resistors 16, 17 and/or 18 determines the rate at which the energized transformer heats the portion of the band connected across its output terminals.

The solenoid 21 of the relay 11 is energized to close its contacts 12 and 13 by closure of a push-button switch 22, providing the circuit breaker or main switch CB in line L1 is closed. With closure of the switch 22 the solenoid 21 is connected across the line through the normally closed contacts 23 of a second relay 24. The circuit for this purpose, beginning with line L1 and going through closed switch 22, is provided by a conductor 25, the closed contacts 23, a conductor 26, the coil 21, and a conductor 27 which connects with the other line L2. The closure of the switch 22 also supplies power to a sensing circuit 28 by energizing the primary of its supply transformer 29 and lights a neon indicator lamp NL, one side of the indicator lamp and one side of the primary of the transformer being connected with the conductor 25, and the other side thereof with the line L2.

The contacts 12 of the relay 11 are in parallel with the push-button switch 22 and, hence, their closure by energization of the relay solenoid 21 provides a holding circuit for the relay, the path of which—beginning with line L1—is through a conductor 30, closed contacts 12, conductor 25, normally closed contacts 23, conductor 26, the solenoid 21 and conductor 27 to the other line L2. Thus, as will no doubt be appreciated, the relay 11 will remain energized until the normally closed contacts 23 of the control relay 24 are opened. This is the function of the sensing circuit 28.

The sensing circuit 28, in addition to its transformer 29 and, more particularly, the secondary thereof, includes a bridge circuit consisting of selected windings of the transformer secondary, a sensitive silicon controlled rectifier 31, resistors 32 and 33, a diode 34, and a photosensitive cell 35. The photosensitive cell, as shown in FIGURE 1, is mounted between the jaws 6 and 7 with its lens positioned to be impinged by light rays emanating from the portion of the band spanning the jaws as it heats up, and as the band heats up the electrical resistance of the photoconductive cell decreases.

When the resistance of the photosensitive cell has decreased to a predetermined value, the silicon controlled rectifier 31 is forward biased and turns on. The instant this happens, the solenoid 36 of the relay 24 is energized and its contacts 23 open. With the opening of the contacts 23, the relay 11 trips and cuts off power to the transformer 10. Resistor 33 which is adjustable and may be adjusted by a control knob 33' on the panel of the control unit 5, enables selection of the temperature to be maintained, and resistor 32 limits the maximum temperature obtainable with the device; while the diode 34 prevents the silicon-controlled rectifier from being forward biased gate to cathode while being reverse biased anode to cathode.

A capacitor 37 is preferably connected in parallel with the solenoid 36 to provide filtering, and a resistor 38 connected in series with the solenoid 36 limits surge currents which would damage the silicon controlled rectifier, and assures proper operating voltage on the solenoid.

As already indicated, the circuit breaker CB connected in line L1 provides main power on-off control, and a fuse 39 provides protection for the sensing circuit.

With proper values for the various components of the circuitry, the system described enables accurate control of the heat applied to the portion of the saw band or other article within a temperature range of approximately 250° F. to 1450° F., so that although the control system is especially adapted for use in annealing spring tempered alloy steel, wherein the maintenance of a temperature of 900° F. for a period of ten seconds provides optimum results, it can be used in annealing other types of steel.

The important point to be borne in mind, though, is that heretofore there was no reliable practical way of accurately determining when the optimum annealing temperature of 900° F. was reached in a metal cutting saw band of spring tempered alloy steel. The characteristic gun barrel blue oxide finish of such bands made it impossible to use the visual observation technique, which is ordinarily used for the purpose. The highest temperature that can be conveniently observed by oxide color is 700° F., and the next visible indication of a definite temperature is that of a dull red color which occurs at 1000° F. 900° F. cannot be visually observed; and as noted hereinbefore, all possible ways of measuring and indicating the temperature of the weld zone of a metal cutting spring tempered alloy steel saw blade during annealing thereof that were tried before the discovery which led to this invention, were unreliable and impracticable.

While direct passage of current through the portion of the saw band being annealed in the manner described is perhaps the most practical way of heating it, those skilled in the art will recognize that other heating means can be employed and controlled in the manner taught by this invention. Thus, for instance, induction heating could be employed, and one way of doing so is illustrated in FIGURE 3 wherein the localized portion of the band to be heated is received between adjacent convolutions of an induction heating coil 50 supplied with high frequency current. This manner of applying heat to a portion of a saw band is disclosed in the Mittelmann Patent No. 2,371,459, of Mar. 13, 1945. Obviously when induction heating is employed, the control circuitry would have to be connected with the coil 50 in such a way as to disconnect the same from its source of high frequency current at the proper instant.

From the foregoing description taken in connection with the accompanying drawings, it will be apparent to those skilled in the art that this invention provides users of spring tempered alloy steel metal cutting saw bands a practicable device for annealing or tempering the weld zones of such bands to the optimum degree of hardness and, most important, does so in a manner which assures reliable repeatability.

What is claimed as our invention is:

1. Means for annealing the weld zone at the welded junction between adjacent ends of a spring tempered alloy steel metal cutting saw band to a predetermined hardness, said means comprising:
  (A) electrically conductive jaws to grip the saw band at opposite sides of the weld zone;
  (B) circuit means operatively connected with said jaws and including a relay to connect the jaws with a source of power and to maintain a flow of current across the weld zone until the relay is tripped; and
  (C) means for automatically tripping said relay when the flow of current across the weld zone has brought the steel of the weld zone to the proper annealing temperature and has held it at said temperature for the proper time to bring about said predetermined hardness, said means comprising (1) a bridge circuit, one leg of which includes an infra-red photoconductive cell positioned to be impinged by light rays emanating from the weld zone being heated, and a silicon controlled rectifier included in the bridge circuit to be rendered conductive when the resistance of the cell has been brought to a predetermined value by the rays impinging upon the cell, and (2) circuit means operatively connecting the bridge circuit with the relay and through which the flow of current in the bridge circuit triggered by the silicon controlled rectifier effects tripping of the relay.

References Cited

UNITED STATES PATENTS

| 2,404,147 | 7/1946 | Strickland | 219—502 |
| 2,942,097 | 6/1960 | Baas | 219—110 |
| 3,324,274 | 6/1967 | Ives | 219—50 |
| 3,354,287 | 11/1967 | Sennello et al. | 219—110 |

OTHER REFERENCES

G.E. Silicon Controlled Rectifier Manual, 3rd ed., 1964, section 7.14.1.

RICHARD M. WOOD, *Primary Examiner.*

B. A. STEIN, *Assistant Examiner.*

U.S. Cl. X.R.

219—110, 502